United States Patent [19]

Champagne

[11] 4,230,052
[45] Oct. 28, 1980

[54] CORNER SUPPORT FOR A SHELVING SYSTEM

[75] Inventor: Gaston Champagne, Longueuil, Canada

[73] Assignee: Cogan Wire & Metal Products (1974) Limited, Montreal, Canada

[21] Appl. No.: 37,760

[22] Filed: May 10, 1979

[51] Int. Cl.³ .............................................. A47F 5/10
[52] U.S. Cl. ...................................... 108/144; 108/107; 211/187; 211/182; 248/243; 403/235
[58] Field of Search .............. 211/187, 182, 186, 208; 108/106, 107, 144; 248/243; 403/232.1, 234, 235, 236

[56] References Cited

U.S. PATENT DOCUMENTS

| 3,281,104 | 10/1966 | Hamilton | 211/186 X |
|---|---|---|---|
| 3,424,111 | 1/1969 | Maslow | 108/144 |
| 3,871,784 | 3/1975 | Van Horn | 403/236 |
| 3,874,511 | 4/1975 | Maslow | 211/153 |
| 4,079,678 | 3/1978 | Champagne | 211/187 X |

Primary Examiner—Roy D. Frazier
Assistant Examiner—Robert W. Gibson, Jr.

[57] ABSTRACT

The invention relates to a corner support for a shelving system of the type described in Canadian Patent No. 1,030,905. The corner support is generally triangular in shape when seen in top view, and has a rear end formed on one leg of the triangular shape and a front end formed on another leg of the triangular shape. Vertically spaced bars are disposed in the rear end to engage with holding notches of the corner posts of the shelving system, and the front end receives a downwardly depending portion of a corner of a shelf. Thus, the corner support is held at and by the corner post, and in turn, holds a corner of the shelf.

5 Claims, 3 Drawing Figures

U.S. Patent   Oct. 28, 1980   4,230,052
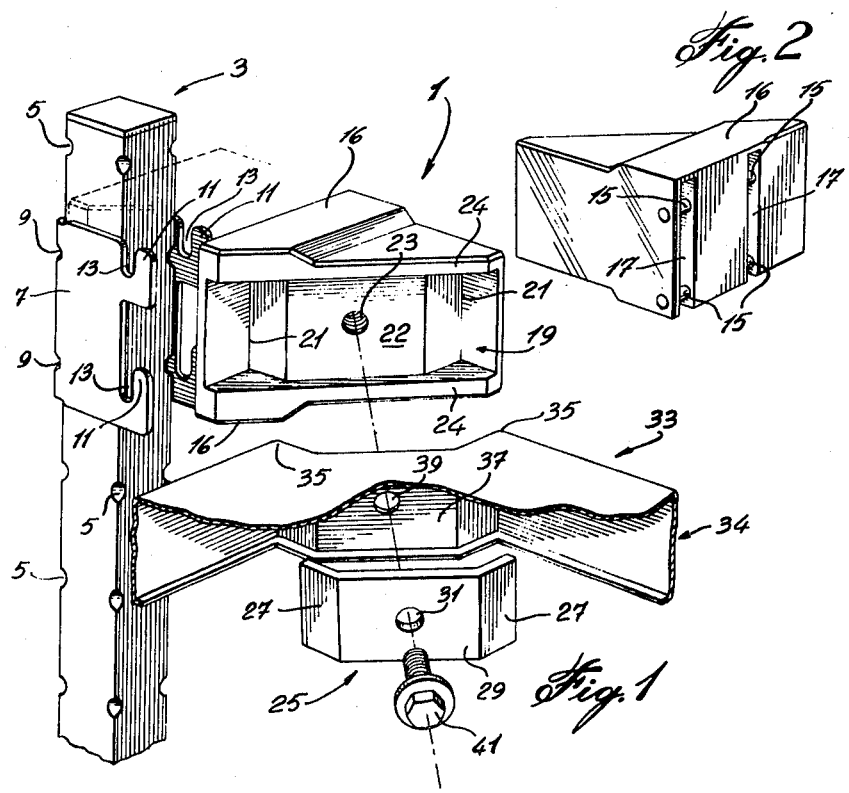
Fig. 2
Fig. 1
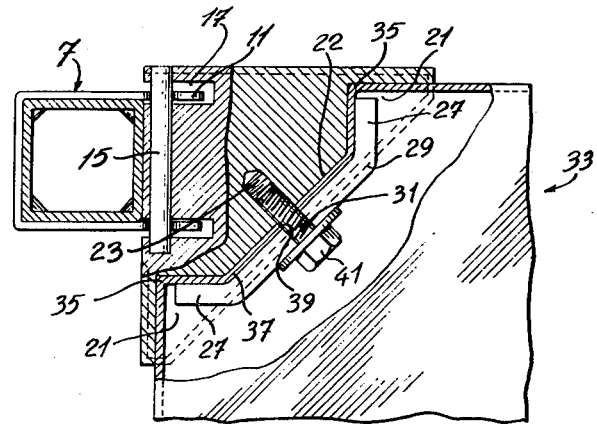
Fig. 3

CORNER SUPPORT FOR A SHELVING SYSTEM

BACKGROUND OF INVENTION (a) Field of the Invention

The invention relates to a corner structure for shelving systems. More specifically, the invention relates to such a corner structure particularly useful for shelving systems as described in Canadian Pat. No. 1,030,905, Champagne, 78-05-09.

(b) Statement of the Prior Art

When mounting removable shelves on corner posts in a shelving system, the stresses at the corners of the shelves present problems as discussed in U.S. Pat. No. 3,874,511, Maslow, Apr. 1, 1975. The Maslow patent teaches one solution to these problems which is particularly adapted to one type of shelving system. The solution comprises the use of a corner support, however, the corner support as taught and claimed in the Maslow patent is not suitable for mounting on corner posts or for use in shelving systems as taught and claimed in the Champagne patent supra.

SUMMARY OF THE INVENTION

It is therefore an object of the invention to provide a corner support which is adapted to the corner posts and shelving systems of the type taught in the Champagne patent supra.

In accordance with the invention, there is provided a corner support for a shelving system; said shelving system including a corner post at each corner thereof, and a holding means on each said corner post, each said holding means including, at one end thereof, upwardly extending side arms defining respective, vertically spaced, sets of notches, and at least one shelf having generally truncated corners and a downwardly depending portion at at least each corner thereof; said corner support comprising: a generally triangular shape when seen in top view; a rear end formed at one of the legs of the triangular shape; a front end formed at another one of the legs of the triangular shape; vertically spaced bar means disposed across said rear end, the spacing between said bar means corresponding to the spacing between said sets of notches; and means at said front end for receiving a respective depending portion at a respective corner of said shelf; whereby, each corner support is held at and supported by a respective holding means, and, in turn, holds and supports a respective corner of said shelf.

BRIEF DESCRIPTION OF THE DRAWINGS

The invention will be better understood by an examination of the following description together with the accompanying drawings in which:

FIG. 1 is an exploded perspective view of the novel corner support and one corner of a shelving system in which it is adapted to be used;

FIG. 2 is a rear perspective view of the corner support; and

FIG. 3 is a top view of one corner of an assembled system.

DESCRIPTION OF PREFERRED EMBODIMENTS

FIG. 1 illustrates a corner support, shown generally at 1, and a corner post of a shelving system on which the support is adapted to be used, shown generally at 3. The corner post includes, as taught in the Champagne patent, a plurality of spaced indentations 5. The detachable part 7 of a holding means, as taught in the patent, includes mating protrusions 9. Extending from 7 at one end thereof are upwardly extending side arms 11 defining respective notches 13. As can be seen, the notches are horizontally spaced to define sets of notches, and the sets are vertically spaced.

Referring to FIG. 2, the rear end of the corner support comprises means for engaging the holding means on the corner posts. In the FIG. 2 embodiment, the means are horizontally extending bars 15 disposed in vertically extending slots 17. The spacing between slots 17 corresponds to the horizontal spacing of the notches. The bars are vertically spaced by a distance equal to the vertical spacing between the sets of notches 13, and the bars are adapted to be disposed in respective notches to thereby be held at and supported by the holding means on the corner posts. As will be apparent, a separate corner support will be placed at each corner of the shelving system and each corner support will be held and supported at each corner in the same way as illustrated herein.

The corner support 1 is of generally triangular shape when seen in top view, and it includes portions 16 adjacent the rear end thereof which portions 16 are thickened in the vertical dimension of the support. The thickened portions are to provide extra strength at the portions of maximum stress.

Groove 19 extends horizontally across the front face of the corner support between spaced lips 24 as shown in FIG. 2. The groove 19 consists of end indentations 21 separated by a flat surface 22. Screw hole 23 is centrally located in the flat surface 22.

Also forming a part of the corner support is clamping member 25. The clamping member includes inwardly inclined end portions 27 separated by flat central portion 29. Hole 31 is centrally located in portion 29.

The corner support is adapted to support a shelf 33, only a corner of which is shown in FIGS. 1 and 3. As seen in these Figures, each corner of the shelf is of generally truncated shape, and the shelf includes a downwardly depending skirt portion 34. Extending from the truncated ends of each corner are protrusions 35 which are adapted to mate with indentations 21 as seen in FIG. 3. The protrusions are separated by flat surface 37 which includes centrally located hole 39.

When assembled, as shown in FIG. 3, holes 31, 39 and 23 line up as do also portions 27, 35 and 21 and 29, 37 and 22. Screw 41 passes through the holes 31 and 39 and is screwed into the screw hole 23. The engagement of the end portions 27, 35 and 21 adds strength to the shelf at the corners thereof, i.e., the points of maximum stress.

Several modifications could be made without departing from the spirit of the invention. Thus, instead of vertical slots 17 at the rear of the support, the bars 15 could be disposed in a horizontal groove which would extend all the way across the rear of the support, although the illustrated arrangement is preferred as it is stronger and sturdier. In addition, the edges of the indentations 21 could be rounded instead of having a pointed edge as shown. In this case, the edges of 35 would be similarly rounded.

Thus, although a single embodiment has been discussed, this was for the purpose of illustrating, but not limiting, the invention. Various modifications, which will come readily to the mind of one skilled in the art, are within the scope of the invention as defined in the appended claims.

I claim:

1. A corner support for a shelving system; said shelving system including a corner post at each corner thereof, and a holding means on each said corner post, each said holding means including, at one end thereof, upwardly extending side arms defining respective, vertically spaced, sets of notches, and at least one shelf having generally truncated corners and a downwardly depending portion at at least each corner thereof;

said corner support comprising:

a generally triangular shape when seen in top view;

a rear end formed at one of the legs of the triangular shape;

a front end formed at another one of the legs of the triangular shape;

vertically spaced bars disposed across said rear end, the spacing between said bars corresponding to the spacing between said sets of notches; and means at said front end for receiving a respective depending portion at a respective corner of said shelf;

whereby, each corner support is held at and supported by a respective holding means, and, in turn, holds and supports a respective corner of said shelf.

2. A corner support as defined in claim 1 wherein the vertical dimension of the portion adjacent said rear end is thickened relative to the thickness of the remainder of the corner support.

3. A corner support as defined in claim 1 wherein said vertically spaced bars extend through vertical slots in said rear end, the spacing between said slots corresponding to the horizontal spacing between said notches, whereby, in operation, respective ones of said notches will be disposed in respective ones of said slots, and respective ones of said bars will be disposed in respective sets of said notches.

4. A corner support as defined in any of claims 1, 2 or 3 wherein said means for receiving comprises;

a groove extending horizontally across said front end;

a screw hole located centrally in said groove;

a clamping member having a shape corresponding to the shape of said groove and adapted to be placed in said groove;

a hole located centrally in said clamping member;

said hole in said clamping member being aligned with said screw hole when said clamping member is placed in said groove;

whereby, in operation, a downwardly depending portion of a shelf is disposed in said groove, said clamping member overlies said downwardly depending portion, and a screw is inserted through said hole in said clamping member, through an aligned hole in said downwardly depending portion and screwed into said screw hole so that the corner of the shelf corresponding to said downwardly depending portion is held by and at said corner support.

5. A corner support as defined in any one of claims 1, 2 or 3 wherein said means for receiving comprises;

a groove extending horizontally across said front end;

said groove comprising indentations at either end thereof separated by a flat surface;

a screw hole located centrally in said flat surface;

a clamping member having inwardly inclined ends separated by a flat central portion;

a hole located centrally in said flat central portion of said clamping member;

said hole in said clamping member being aligned with said screw hole when said clamping member is placed in said groove;

whereby, in operation, a downwardly depending portion of a shelf is disposed in said groove, said clamping member overlies said downwardly depending portion, and a screw is inserted through said hole in said clamping member, through an aligned hole in said downwardly depending portion and screwed into said screw hole so that the corner of the shelf corresponding to said downwardly depending portion is held by and at said corner support.

* * * * *